(12) United States Patent
Talisman

(10) Patent No.: US 6,640,818 B1
(45) Date of Patent: Nov. 4, 2003

(54) REFRIGERATED AUTOMATIC FRUIT AND VEGETABLE WASHER

(76) Inventor: Rueben Talisman, 12106 Pine Brook Dr., Stafford, TX (US) 77477

( * ) Notice: Subject to any disclaimer, the term of this patent is extended or adjusted under 35 U.S.C. 154(b) by 0 days.

(21) Appl. No.: 10/393,830

(22) Filed: Mar. 20, 2003

Related U.S. Application Data

(60) Provisional application No. 60/365,728, filed on Mar. 20, 2002.

(51) Int. Cl.$^7$ .................................................. B08B 3/02
(52) U.S. Cl. ..................... 134/89; 134/105; 134/115 R; 99/517; 15/3.12
(58) Field of Search .................... 15/3.1, 3.12, 3.14, 15/3.15, 3.16; 99/516, 517; 62/303, 310, 311, 331; 134/84, 85, 89, 105, 115 R, 201

(56) References Cited

U.S. PATENT DOCUMENTS

| | | | |
|---|---|---|---|
| 1,931,463 A | * | 10/1933 | Brogden |
| 1,950,304 A | * | 3/1934 | High |
| 1,961,337 A | * | 6/1934 | Cornell |
| 2,010,497 A | * | 8/1935 | Skinner |
| 2,172,331 A | * | 9/1939 | Chrisetn, Jr. |
| 2,249,792 A | * | 7/1941 | Skinner |
| 2,531,463 A | * | 11/1950 | Pryor et al. |
| 3,447,544 A | * | 6/1969 | De Vergara |
| 4,377,935 A | * | 3/1983 | Curtis |
| 5,097,755 A | * | 3/1992 | Hill |
| 5,113,881 A | | 5/1992 | Lin et al. |
| 5,226,972 A | * | 7/1993 | Bell |
| 5,437,731 A | | 8/1995 | St. Martin |
| 5,520,004 A | * | 5/1996 | Jones, III |
| 5,858,116 A | | 1/1999 | Kim |
| 6,216,469 B1 | * | 4/2001 | Miller |

FOREIGN PATENT DOCUMENTS

| | | | |
|---|---|---|---|
| DE | 198 07 968 | * | 8/1999 |
| JP | 62-61547 | * | 3/1987 |
| JP | 63-202337 | * | 8/1988 |
| JP | 2001-149002 | * | 6/2001 |

OTHER PUBLICATIONS

European Patent Office 285,235 Oct. 1988.*
WIPO WO 95/23517 Sep. 1995.*

* cited by examiner

Primary Examiner—Frankie L. Stinson
(74) Attorney, Agent, or Firm—Kenneth A. Roddy

(57) ABSTRACT

A refrigerated automatic fruit and vegetable washer that washes fruits and/or vegetables and stores them in a cool environment after they have been washed. A portable self-contained embodiment has a cabinet that sits on a countertop and contains a water spray system and a thermoelectric cooling system and sits on a kitchen countertop and has water inlet and drain hoses releasably connected to the sink faucet. Another self-contained embodiment fits into a lower storage compartment of a refrigerator and can be removed and placed on the countertop for the washing operation. A built-in cabinet embodiment is permanently installed in the kitchen. A wash-only embodiment is slidably received in the lower portion of a refrigerator in place of the existing vegetable crisper to be cooled by the refrigerator cooling system and is removed therefrom and placed on a countertop for the washing operation. The fruit and vegetable washer may also be built into a refrigerator as an integral component of the refrigerator.

20 Claims, 7 Drawing Sheets

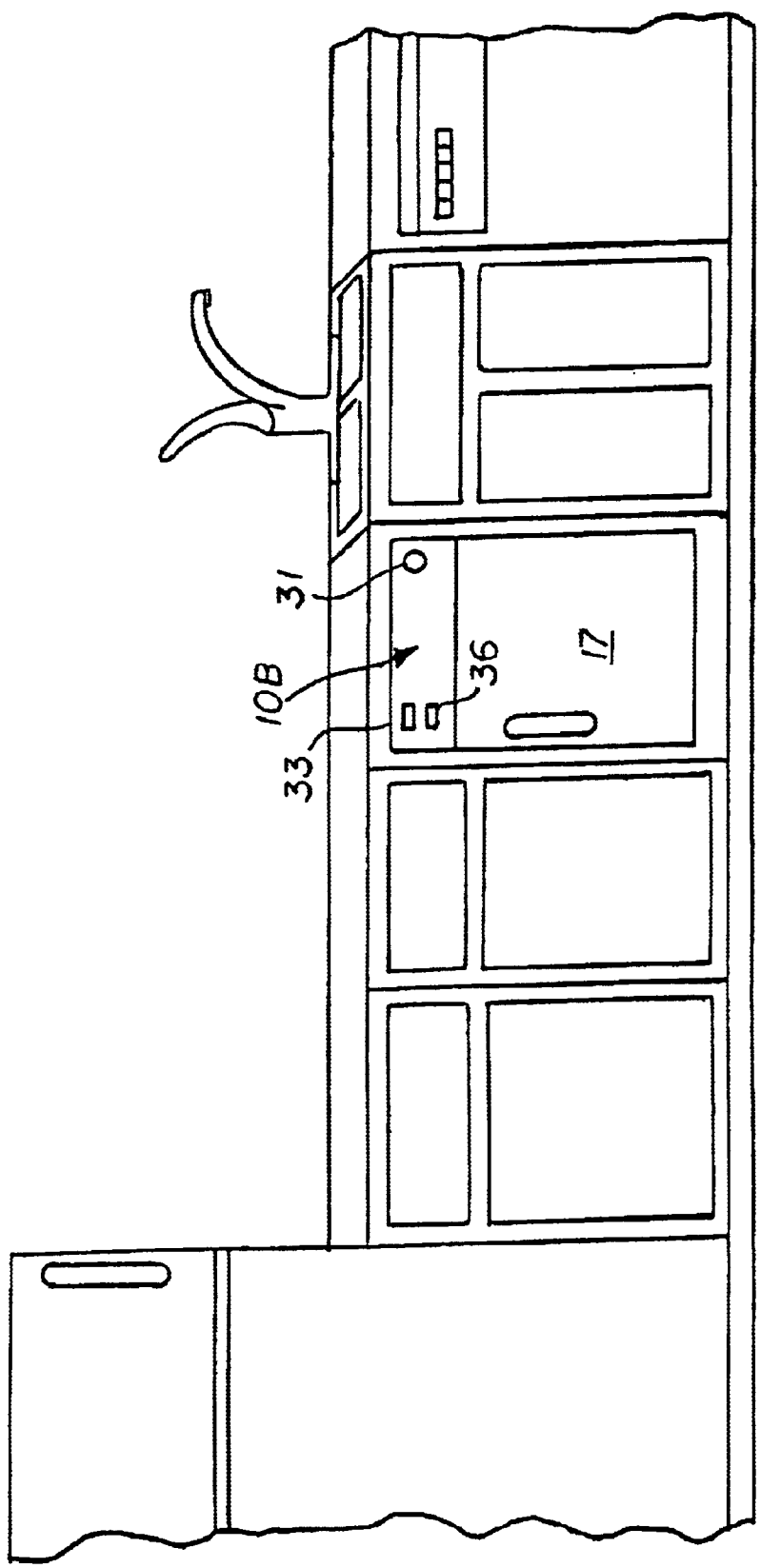

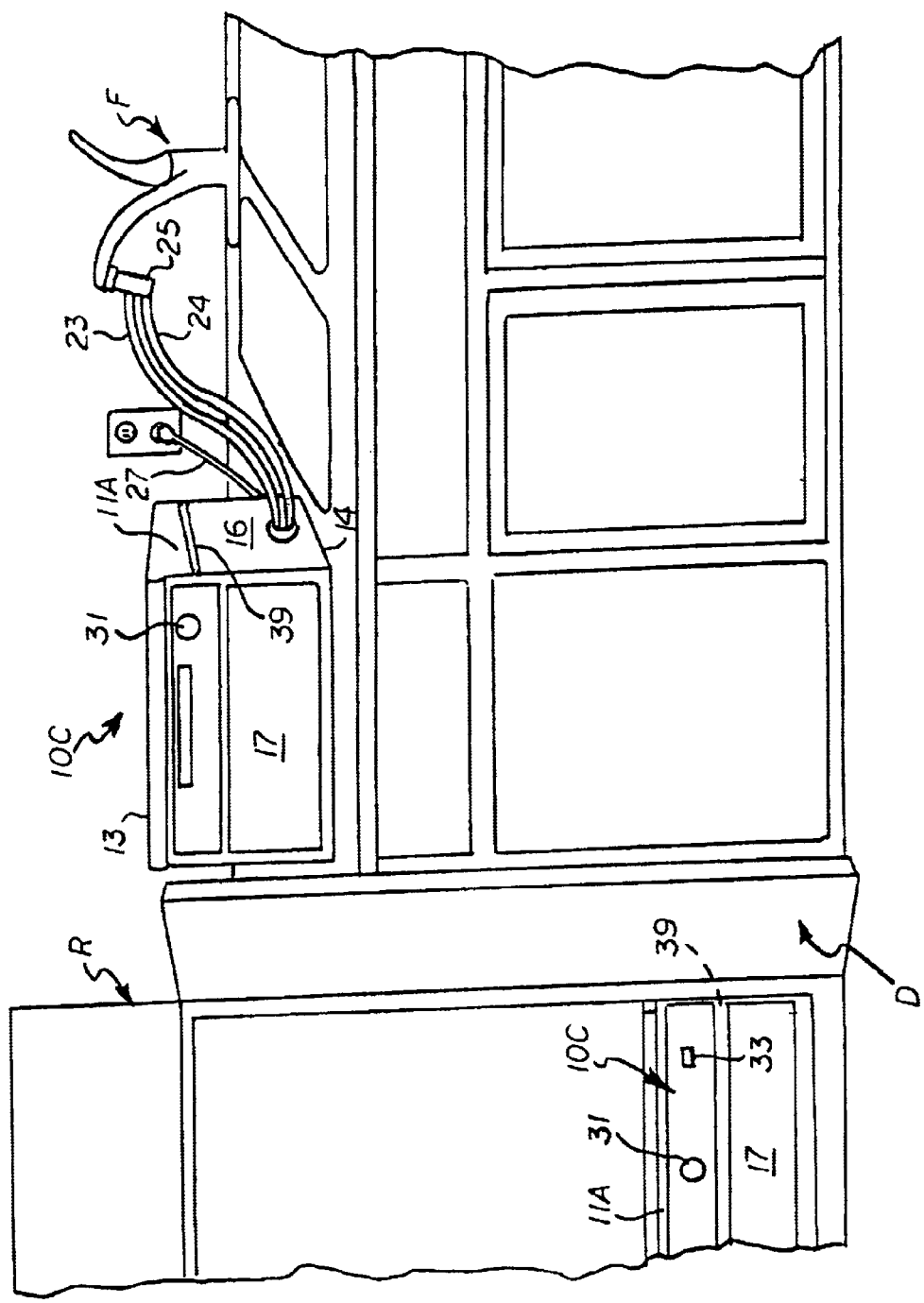

REFRIGERATED AUTOMATIC FRUIT AND VEGETABLE WASHER

CROSS REFERENCE TO RELATED APPLICATION

This application claims priority of U.S. Provisional Application Serial No. 60/365,728, filed Mar. 20, 2002.

BACKGROUND OF THE INVENTION

1. Field of the Invention

This invention relates generally to kitchen appliances, and more particularly to a refrigerated automatic fruit and vegetable washer that washes fruits and/or vegetables and stores them in a cool environment after they have been washed.

2. Brief Description of the Prior Art

Fruits and vegetable are subjected pesticides, herbicides and fungicides that are sprayed on them to prevent damage from insects, worms, fungi, viruses, bacteria etc. The public is becoming increasing aware of the cumulative health effects caused by unavoidable or unintentional consumption of residues of toxic pesticides, herbicides and fungicides, as well as microbiological contaminants.

Over a period of time, insects and microbiological contaminants can become immune to the existing pesticides, herbicides and fungicides and new, stronger products of these types are being introduced to overcome this problem.

Most people hand wash their fruits and vegetables after purchase in order to reduce the likelihood of adverse health effects that may be caused by inadvertent consumption of strong or toxic pesticide, herbicide and fungicide residues. Hand washing is usually carried out at the kitchen sink and is a time consuming, laborious task. After the fruits and/or vegetables are washed, they are usually placed in drain basket on the kitchen counter and allowed to dry and thereafter are placed in the vegetable crisper of the refrigerator so that they will stay cool and fresh. Cooling of fruits and vegetables is desirable to slow down deterioration and maintain freshness.

Lin et al, U.S. Pat. No. 5,113,881 discloses a dynamic ultrasonic cleaning and disinfecting device and method for the ultrasonic cleaning and disinfecting of fruit and vegetables, which stirs the fruit and vegetable items within a cleaning tank filled with water and suitable cleaning agent, while exposing all of their sides to a maximum level of vibration energy to achieve cleaning. There is no provision for cooling and storing the fruits and vegetables.

St. Martin, U.S. Pat. No. 5,437,731 discloses a method of washing produce wherein the vegetable and/or fruit, is supported upon a screen basket suspended within a closed cabinet. Each of a plurality of nozzles disposed about the basket emits a filled cone of washing liquid to scour the produce and to dislodge by agitation and flotation debris therefrom. After filtering of the washing fluid through a screen in the cabinet, the washing fluid is recycled by a pump pumping the washing fluid from a collection trough to the nozzles. Preferably, the washing fluid is slightly acidic. There is nor provision for cooling and storing the fruits and vegetables.

Kim, U.S. Pat. No. 5,858,116 discloses a device for cleansing bowls that has a fruit and vegetable cleansing mode. The cleansing device comprises: a cabinet for forming a cleansing room; a cleansing basket installed inside the cleansing room, for loading therein articles to be cleansed; a spray nozzle for spraying the cleansing water to the articles loaded in the cleansing basket; a pump for supplying the cleansing water to the spray nozzle; a heater for heating the cleansing water; a mode selector for selecting one of a plurality of modes including a bowl cleansing mode and a fruit and vegetable cleansing mode; and a controller for controlling the heater so that the cleansing water has a temperature suitable for the cleansing mode selected through the mode selector. The bowl cleansing device may further comprise: a temperature sensor for detecting the temperature of the cleansing water, wherein the controller controls the heater according to the detected temperature of the cleaning water; and a pollution sensor for detecting the pollution level of the cleansing water, wherein if the detected pollution level is below a preset reference value after a cleansing operation, the controller determines that the cleansing operation is completed and stops the cleansing operation. There is nor provision for cooling and storing the fruits and vegetables.

The present invention is distinguished over the prior art in general, and these patents in particular by a refrigerated automatic fruit and vegetable washer that washes fruits and/or vegetables and stores them in a cool environment after they have been washed. A portable self-contained embodiment has a cabinet that sits on a countertop and contains a water spray system and a thermoelectric cooling system and sits on a kitchen countertop and has water inlet and drain hoses releasably connected to the sink faucet. Another self-contained embodiment fits into a lower storage compartment of a refrigerator and can be removed and placed on the countertop for the washing operation. A built-in cabinet embodiment is permanently installed in the kitchen. A wash-only embodiment is slidably received in the lower portion of a refrigerator in place of the existing vegetable crisper to be cooled by the refrigerator cooling system and is removed therefrom and placed on a countertop for the washing operation. The fruit and vegetable washer may also be built into a refrigerator as an integral component of the refrigerator.

SUMMARY OF THE INVENTION

It is therefore an object of the present invention to provide a portable refrigerated automatic fruit and vegetable washer that easily and quickly washes fruits and/or vegetables and stores them in a cool environment after they have been washed.

It is another object of this invention to provide a portable self-contained refrigerated automatic fruit and vegetable washer that sits on a countertop and contains a water spray system and a cooling system and is easily and quickly connected to the sink faucet.

Another object of this invention is to provide a portable self-contained refrigerated automatic fruit and vegetable washer which fits into a lower storage compartment of a refrigerator and can be removed and placed on a countertop for the washing operation.

Another object of this invention is to provide a refrigerated automatic fruit and vegetable washer that is permanently installed in the kitchen beneath a countertop.

Another object of this invention is to provide a fruit and vegetable washer which is slidably received in the lower portion of a refrigerator in place of an existing vegetable crisper to be cooled by the refrigerator cooling system and is removed therefrom and placed on a countertop for the washing operation.

A further object of this invention is to provide a refrigerator having a fruit and vegetable washer compartment that washes fruits and/or vegetables and stores them in a cool environment after they have been washed.

A still further object of this invention is to provide a fruit and vegetable washer which is simple in construction, inexpensive to manufacture, and reliable in operation.

Other objects of the invention will become apparent from time to time throughout the specification and claims as hereinafter related.

The above noted objects and other objects of the invention are accomplished by a refrigerated automatic fruit and vegetable washer that washes fruits and/or vegetables and stores them in a cool environment after they have been washed. A portable self-contained embodiment has a cabinet that sits on a countertop and contains a water spray system and a thermoelectric cooling system and sits on a kitchen countertop and has water inlet and drain hoses releasably connected to the sink faucet. Another self-contained embodiment fits into a lower storage compartment of a refrigerator and can be removed and placed on the countertop for the washing operation. A built-in cabinet embodiment is permanently installed in the kitchen. A wash-only embodiment is slidably received in the lower portion of a refrigerator in place of the existing vegetable crisper to be cooled by the refrigerator cooling system and is removed therefrom and placed on a countertop for the washing operation. The fruit and vegetable washer may also be built into a refrigerator as an integral component of the refrigerator.

BRIEF DESCRIPTION OF THE DRAWINGS

FIG. 5 is a perspective view of a third embodiment of the fruit and vegetable washer that may be permanently installed in the kitchen.

FIG. 6 is a perspective view of a fourth embodiment of the portable fruit and vegetable washer that is slidably received in the lower portion of a refrigerator in place of the existing vegetable crisper and removed therefrom to be placed on a countertop for the washing operation.

DESCRIPTION OF THE PREFERRED EMBODIMENTS

Portable Countertop Unit

Figure 1:
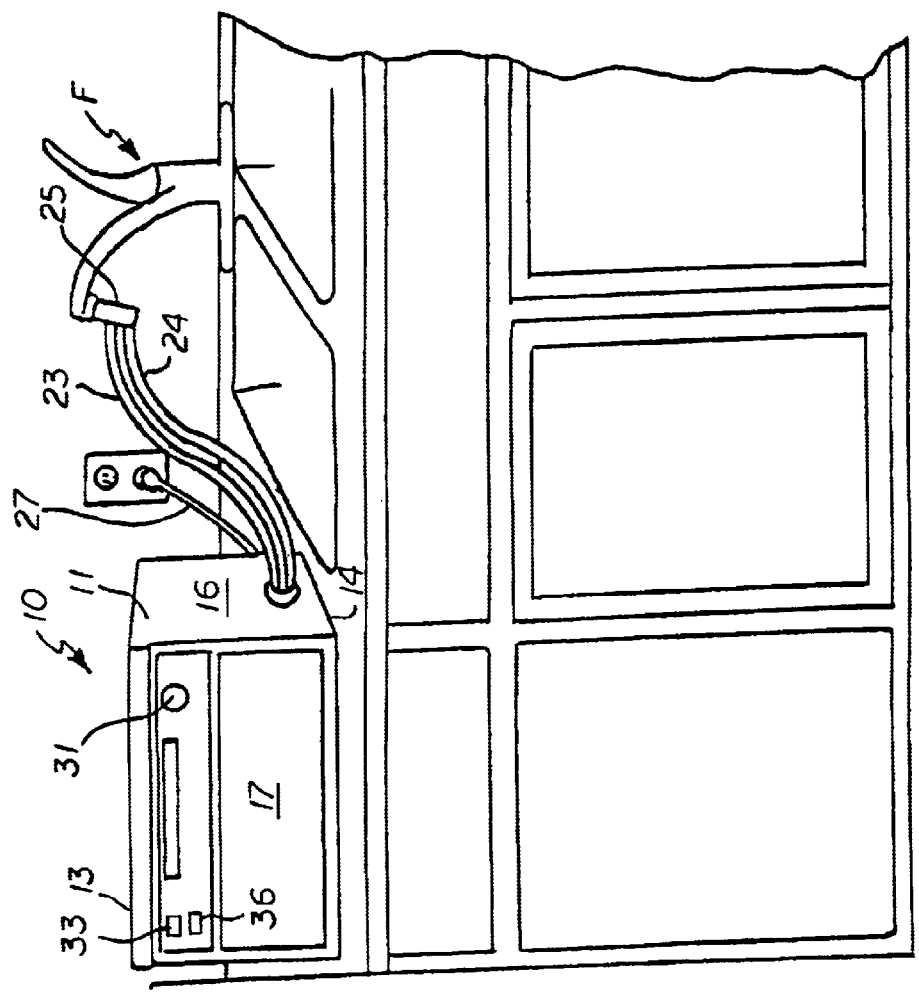
FIG. 1 is a perspective view of a portable automatic fruit and vegetable washer in accordance with a first embodiment of the present invention, which sits on a kitchen countertop.
Figure 1A:
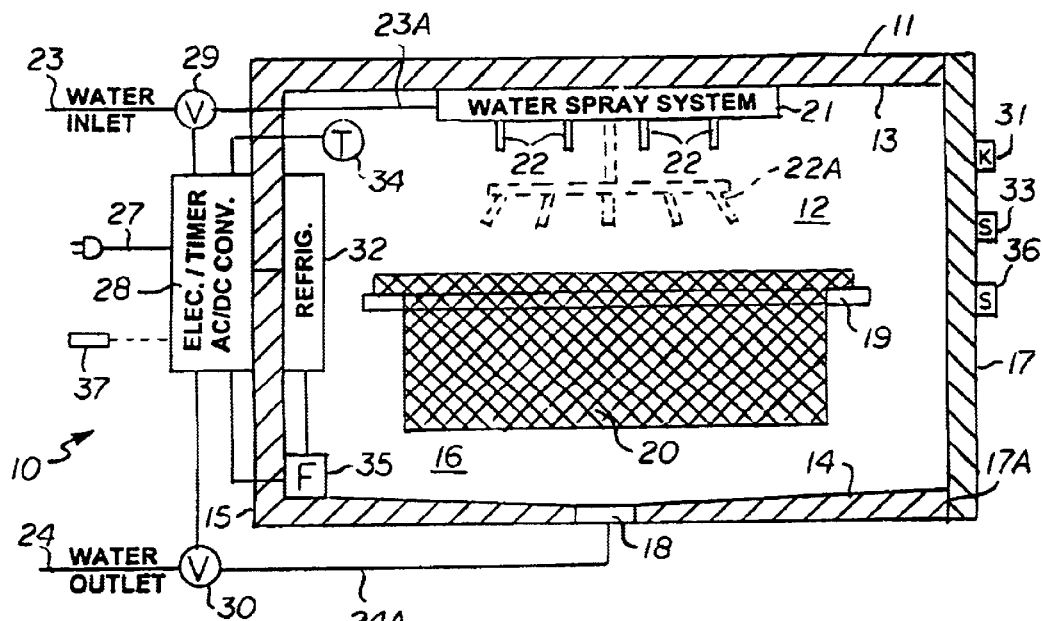
FIG. 1A is a schematic diagram of the automatic fruit and vegetable washer of FIG. 1.

Referring to the drawings by numerals of reference, there is shown in FIGS. 1 and 1A, a fruit and vegetable washer 10 in accordance with a first embodiment of the present invention. In this embodiment, the fruit and vegetable washer 10 is a portable appliance unit having a generally rectangular cabinet 11 about the size of a small microwave oven, which sits conveniently on a kitchen countertop. The cabinet 11 is thermally insulated and has an interior 12 defined by top and bottom walls 13 and 14, a back wall 15, lateral side walls 16, and a door 17 with an airtight and watertight seal 17A. The bottom wall 13 may taper downwardly from the sides and is provided with a drain 18. Rails 19 are mounted on the interior lateral side walls 16 of the cabinet and slidably receive and support one or more open mesh trays or baskets 20 sized and shaped to hold a plurality of fruits and/or vegetables of various size.

A water spray system 21 is provided on the interior of the cabinet 11. The water spray system 21 may have one or more spray nozzles 22 that are positioned to spray water onto the fruits and/or vegetables contained in the trays or baskets 20. Alternatively, the water spray system 21 may incorporate one or more rotating arms with nozzles 22A, similar to a small portable dishwasher. A water inlet hose 23 is connected at a first end in fluid communication with the water spray system 21, and a water drain hose 24 is connected at a first end in fluid communication with the drain 18 in the bottom wall of the cabinet.

Figure 2:
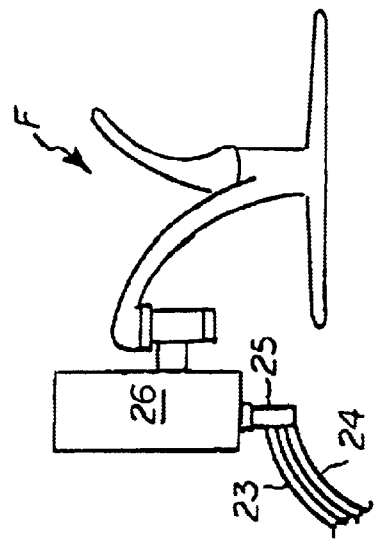
FIG. 2 is a perspective view of a filter unit that may be installed on a kitchen sink faucet and connected to a faucet adapter of the fruit and vegetable washer.

The water inlet hose and drain hose 23 and 24 are both connected at their second ends in fluid communication with a faucet adapter 25 which fits onto the outlet of the existing sink water faucet F. The faucet adapter 25 is internally ported to direct fresh water into the washer and direct water drained from the washer 10 into the sink drain. Such faucet adapters are commercially available and are conventionally used with portable dishwashers. The hoses 23 and 24 may be retractable into a compartment at the side or rear of the cabinet 11 and pulled out together along with the faucet adapter 25. Caps or plugs (not shown) may be provided to seal the open ends of the faucet adapter to maintain the unit air tight, and facilitate refrigeration after the washing cycle. Optionally, as shown in FIG. 2, a water filter 26 may be installed on the sink faucet outlet, wherein the faucet adapter 25 is installed on the outlet of the water filter. Alternatively, a water filter may be provided in the water supply conduit 23A of the cabinet.

An electrical circuit 28 housed on the cabinet 11 is connected to a conventional 110volt AC electrical outlet by a power cord 27. A water inlet valve 29 and a water drain valve 30 are connected with the water supply conduit 23A and drain conduit 24A, to control water supplied to the water spray system 21 and from the drain 18, respectively. A timer in the electrical circuit 28 controls the operation of the inlet and drain valves 29 and 30. A timer control knob 31 on the exterior of the cabinet allows the user to select desired time intervals for directing a spray of water onto the fruit and/or vegetables contained the basket 20. The electrical circuitry is well known and readily understood in the art and therefore not shown in detail.

In this embodiment, the cabinet 11 of the washer 10 is provided with a refrigeration system 32 for cooling the fruits and/or vegetables. Preferably, refrigeration system 32 is a thermoelectric system of the type developed by NASA and used in portable thermoelectric coolers or ice chests that typically operate on 12-volt DC power. The thermoelectric cooling system utilizes a solid-state thermoelectric Peltier effect heating and cooling unit that eliminates the need for bulky compressors and cooling coils. The thermoelectric cooling unit may be disposed in the side wall, back wall, top wall, or door of the cabinet. Because such thermoelectric cooling/heating systems are known in the art, details of the thermoelectric cooling/heating unit are not shown in the drawings. It should be understood that the washer may utilize one or a plurality of thermoelectric Peltier effect cooling and heating units.

The thermoelectric Peltier effect cooling and heating unit has a heat sink secured to one surface of a Peltier thermovoltaic member. The heat sink may be finned or may be formed of a relatively new highly efficient thermally conductive open cell carbon foam medium through which air can pass, and may be partially enclosed by a shroud. The Peltier thermovoltaic member is electrically connected with an AC/DC converter that is connected in the electrical circuit 28 housed on the cabinet and converts the 110-volt AC power supply to 12-volt DC electrical power. As well known in the art, the thermovoltiac member will get cold when polarized DC current is applied and will get warm when the polarity is reversed.

An on/off switch 33 on the cabinet is electrically connected with the AC/DC converter in the electric circuit 28 to supply polarized 12-volt DC power to the Peltier thermovoltaic member. A thermostat 34 is connected in the circuit to control 12-volt DC power supplied to the Peltier thermovoltaic member to regulate the temperature inside the cabinet.

The washer 10 may utilize convection cooling to maintain the cabinet interior 12 and the fruits and/or vegetables contained in the trays or baskets 20 at desired cool temperature. Alternatively, a small electric fan 35 electrically connected with the electrical circuit 28 and thermostat 34 may be provided to conduct air across the fins or through the pores of the carbon foam heat sink to circulate the air in the interior 12 more rapidly than convection alone.

A polarity reversing switch 36 electrically connected with the AC/DC converter may be provided for reversing the polarity of the 12-volt DC power supplied to the Peltier thermovoltaic member for warming the cabinet interior 12 and facilitate faster drying of the fruits and/or vegetables contained in the trays or baskets, which would also be regulated by the thermostat 34.

In the embodiment of FIGS. 1 and 1A, the washer 10 is a self-contained unit and can be used to wash and to store the washed fruits and/or vegetables. After the fruits and/or vegetables have been washed, the faucet adapter 15 is removed from the faucet and capped or plugged to seal its open ends and maintain the unit air tight, the hoses 13 and 14 are retracted, and the washer can be moved, if so desired, and connected to any convenient electric outlet.

As shown in dashed line in FIG. 1A, the portable washer 10 may be provided with a bypass circuit that bypasses the AC/DC converter and a power cord and plug 37 adapted to be coupled to a 12V power source such as a cigarette lighter or battery so that the system can be used outdoors, or in a vehicle, or where a 110-volt power supply is not available.

Self-Contained Refrigerator Slide-In Unit

Figure 4:
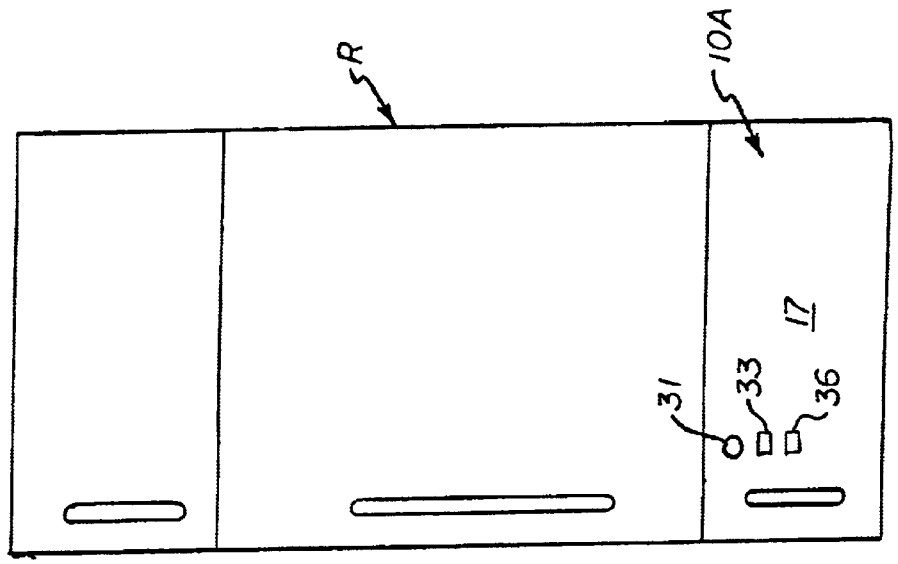
FIGS. 3 and 4 are perspective views of a modified refrigerator having lower storage compartment, and a second embodiment of the self-contained portable fruit and vegetable washer that is slidably received in the storage compartment, respectively.
Figure 3:
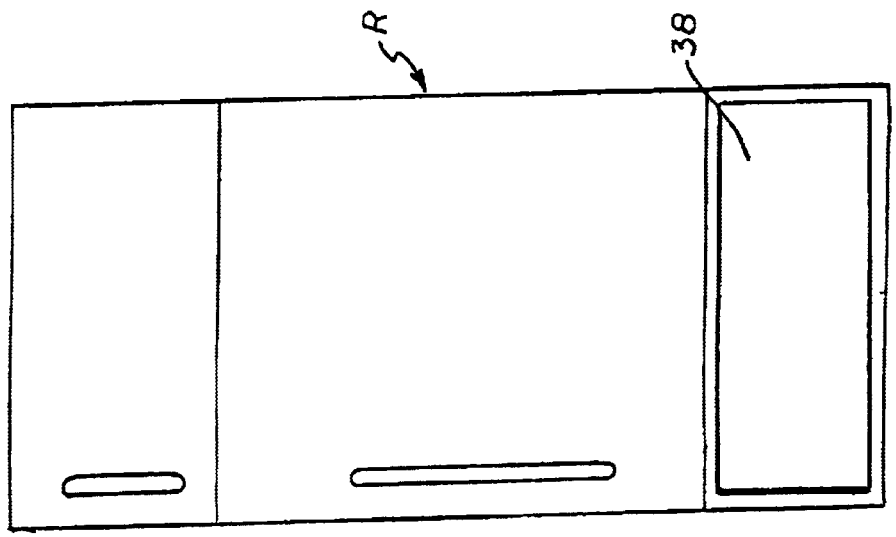

Referring now to FIGS. 3 and 4. there is shown a second embodiment of the self-contained portable fruit and vegetable washer 10A, similar to the embodiment of FIGS. 1 and 1A, but which is sized and shaped slide into a modified refrigerator. As seen in FIG. 3 the lower end of the refrigerator R is provided with a generally rectangular storage compartment 38 having an open front end which occupies the space normally taken up by the conventional vegetable crisper. The washer 10A, shown in FIG. 4, is provided with all of the same components of the embodiment of FIGS. 1 and 1A shown and described above with reference to FIGS. 1 and 1A, but the power cord 27 is removably connected with the washer cabinet 11 and electrical circuit 28 through a receptacle so that it can be unplugged from the cabinet, and the door 17 of the cabinet is designed to match the exterior decor of the refrigerator.

To wash fruits and/or vegetables, the washer 10A is removed from the storage compartment 38 of the refrigerator R and placed on the countertop near the sink and the faucet adapter is connected to the faucet or the filter attached to the faucet, as described previously, and the power cord 27 is plugged into the receptacle on the washer cabinet and the electrical wall outlet. After the fruits and/or vegetables have been washed and dried or allowed to dry, the power cord is unplugged and removed, the inlet and drain hoses 23 and 24 are retracted and the open ends of the faucet adapter 25 are plugged or capped, and the washer 10A is slid into the storage compartment 38 of the refrigerator. When the washer is stored in the refrigerator storage compartment 38, its door 12 matches the decor of the refrigerator similar to a freezer door.

Built-In Cabinet Unit

Referring now to FIG. 5, there is shown a third embodiment of the fruit and vegetable washer 10B that is about the size of a conventional under-counter dishwasher and may be permanently installed in the kitchen. The washer 10B is provided with all of the same components of the embodiment of FIGS. 1 and 1A shown and described above with reference to FIGS. 1 and 1A, but the interior water spray system 21 is connected by conduit to the existing cold water supply line and the interior drain is connected to the existing kitchen drain line, rather than with hoses. The electrical circuit 28 housed on the cabinet is hard wired with the existing 110-volt AC electrical house wiring and power to the unit may be controlled by an on-off switch on the kitchen wall. The embodiment of FIG. 5 has the same airtight and watertight door 17 and sliding trays or baskets 20 for holding fruits and/or vegetables, as previously described, but larger in size. A water filter may be provided in the water supply conduit of the cabinet.

The washer 10B is also provided with the refrigeration system 28 utilizing the thermoelectric Peltier effect cooling/warming unit and the associated timer, thermostat, and electrical circuit controls, and operates in the same manner as described previously. Alternatively, because it is larger, the washer 10B may be provided with a conventional gas refrigeration system with the associated compressor, cooling coils and fan.

As with the previously described embodiments, the washer 10B is a self-contained unit and can be used to wash the fruits and/or vegetables and to store the washed fruits and/or vegetables in a cool environment after they have been washed.

Commercial Restaurant Unit

It should be understood that units similar to the embodiment of FIG. 5 may be made in even larger sizes (not shown) about the size of commercial refrigerators or freezers for use in commercial establishments such as restaurants, salad bars, delicatessens, etc. These commercial size units would have their interior water spray system 21 connected by conduit to the existing cold water supply line and interior drain connected to the existing kitchen drain line of the establishment. Because they are much larger, they would have a plurality of sliding trays or baskets for holding fruits and/or vegetables. Also, because they are much larger, the commercial size fruit and vegetable washers may be provided with conventional gas refrigeration systems with the associated compressor, cooling coils and fan.

Wash Only Refrigerator Slide-In Unit

Figure 6A:
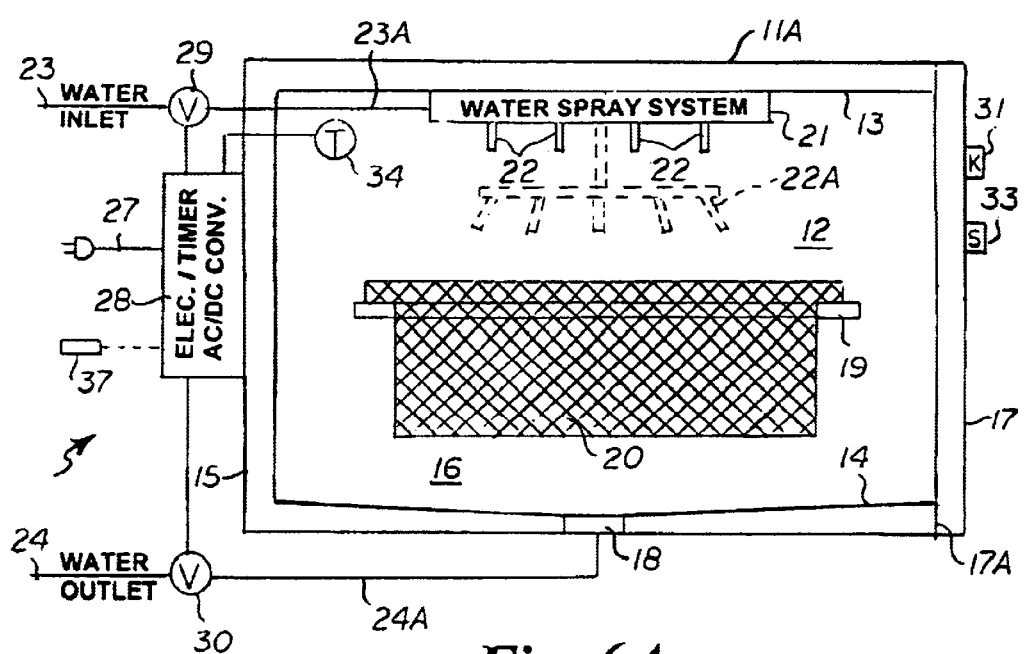
FIG. 6A is a schematic diagram of the automatic fruit and vegetable washer of FIG. 6.

Referring now to FIGS. 6 and 6A, there is shown a fourth embodiment of the portable fruit and vegetable washer 10C, similar to the previously described embodiments, but which is sized and shaped to replace the existing vegetable crisper of a conventional refrigerator R. In this modification, the washer cabinet 11A is provided with rails 39 which may be slidably supported on existing vegetable crisper support tracks in the lower portion of the refrigerator. The washer 10C may be removably inserted in place of the vegetable crisper and removed therefrom and placed on a countertop for washing fruits and/or vegetables.

The washer 10C has the same water spray system, valves and timing controls, retractable water inlet and drain hoses with faucet adapter, an airtight and watertight door, and sliding trays or baskets for holding fruits and/or vegetables, as previously described. However, in this embodiment, the cooling/warming refrigeration system is eliminated and the washer cabinet 11A is not be insulated but is thermally conductive. The power cord 27 is removably connected with the electrical circuit 28 through a receptacle on the cabinet so that it may be unplugged from the cabinet.

To wash fruits and/or vegetables, the washer 10C is removed from the refrigerator R and placed on the countertop near the sink and the faucet adapter 15 is connected to the faucet or the filter attached to the faucet, as described previously. After the fruits and/or vegetables have been washed and allowed to dry, the hoses 23 and 24 are retracted and the open ends of the faucet adapter 25 are left unplugged or uncapped to facilitate air circulation through the interior of the washer cabinet, the washer 10C is slid into the refrigerator and supported on the existing vegetable crisper tracks, and the refrigerator door D is closed. After the refrigerator door D is closed, the interior of the washer cabinet 11A and fruits and/or vegetables stored therein are maintained at a cool temperature by the existing refrigerator refrigeration system and air circulation fan.

Refrigerator Built-In Unit

Figure 7:
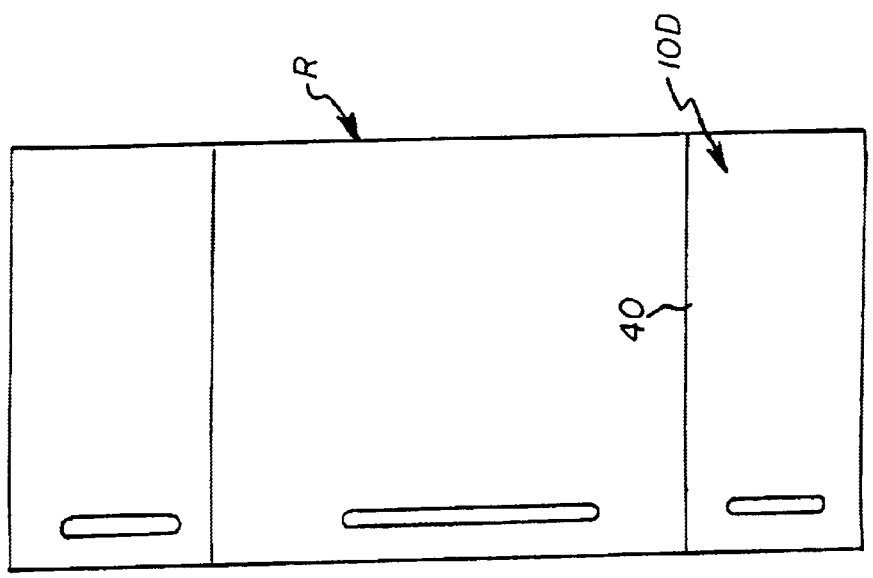
FIG. 7 is a perspective view of a fifth embodiment of the fruit and vegetable washer in accordance with the present invention which is built into a refrigerator and replaces the vegetable crisper at the lower portion of the refrigerator.
Figure 7A:
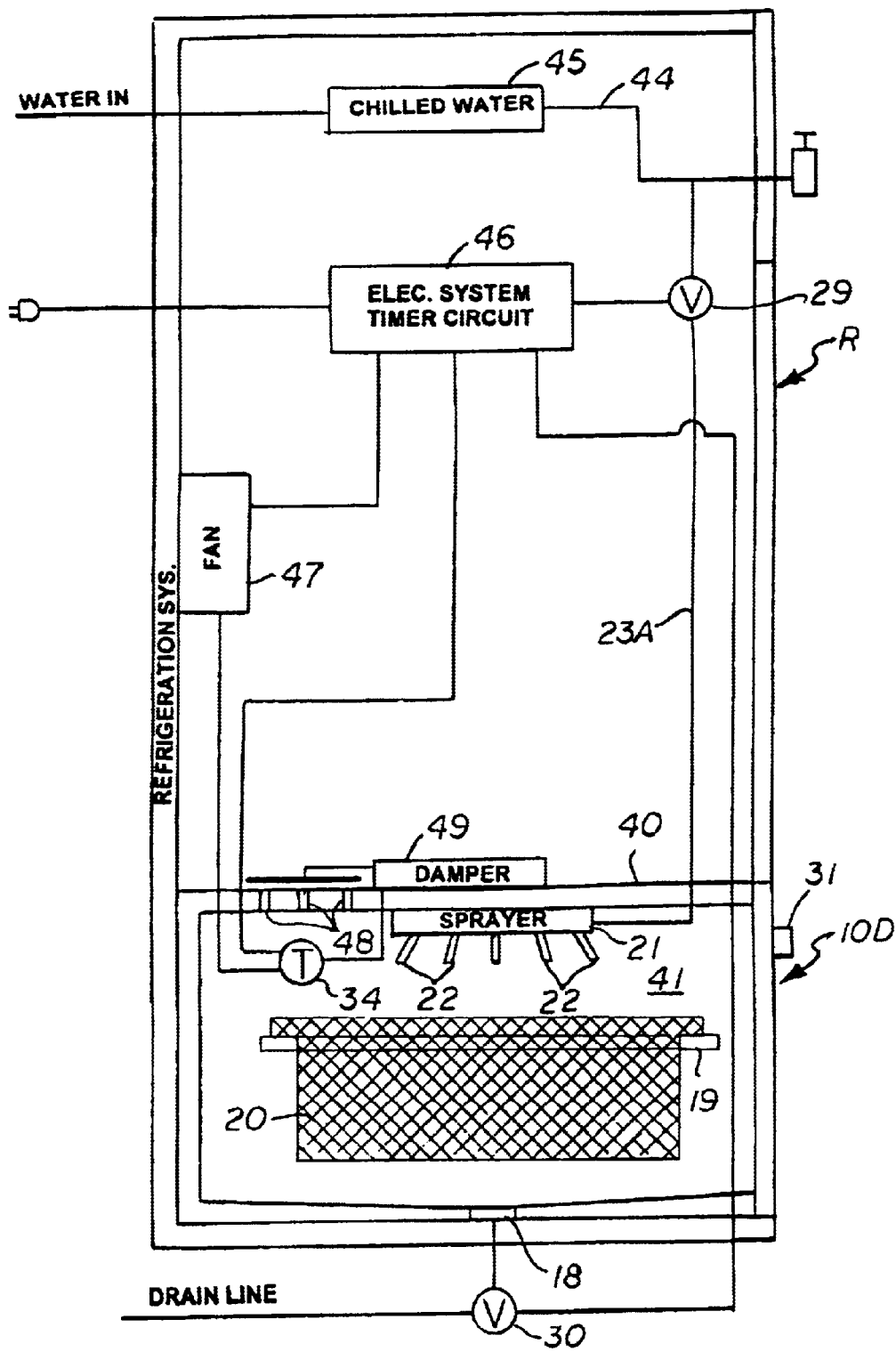
FIG. 7A is a schematic diagram of the automatic fruit and vegetable washer of FIG. 7.

Referring now to FIGS. 7 and 7A, there is shown a fifth embodiment of the fruit and vegetable washer 10D that is permanently built into the lower portion of a conventional refrigerator R having a chilled water dispensing system. Because the components of the refrigerator are conventional and readily understood by those skilled in the art, they are represented schematically and not shown in detail in the drawings.

In this embodiment the washer 10D is in the form of a compartment 40 of the refrigerator R having an interior 41 and a hinged door 42 that matches the decor of the refrigerator and is provided with an airtight and watertight seal 43, similar to the convention freezer door. The fruit and vegetable washer compartment interior 41 has rails 19 that slidably receive and support open mesh trays or baskets 20 for holding fruits and/or vegetables, and a water spray system 21, as previously shown and described. The interior water spray system 21 is connected with the existing chilled water line 44 of the refrigerator chilled water dispensing system 45 by a water inlet conduit 23A and a water supply valve 29, and the interior drain 18 at the bottom of the compartment is connected with the existing refrigerator drain through a drain valve 30. Alternatively, the interior drain 18 and drain valve 30 may be connected by conduit with the drain line of the premises. A timer and control knob 31 connected with the existing refrigerator electrical circuit 46 control the water supply and drain valves 29 and 30.

The interior 41 of the fruit and vegetable compartment 40 is in communication with the existing fan 47 and air circulation system of the refrigerator through ducts or passageways 48 and a damper 19 disposed between the compartment interior 41 and the refrigerator interior. The interior 41 of the washer compartment 40 is cooled by air conducted by the refrigerator fan 47 through the ducts or passageways 48 and air flow into the compartment is controlled by the damper 49. The damper 49 is connected with the existing refrigerator electrical circuit 46 and operation of the fan 47 and damper 49 are controlled by a thermostat 34 to regulate the temperature inside the fruit and vegetable washer compartment.

The fruit and vegetable washer compartment 40 can be used to wash the fruits and/or vegetables and to store the washed fruits and/or vegetables in a cool environment after they have been washed.

While this invention has been described fully and completely with special emphasis upon preferred embodiments, it should be understood that within the scope of the appended claims the invention may be practiced otherwise than as specifically described herein.

What is claimed is:

1. A refrigerated automatic fruit and vegetable washer, comprising:

a generally rectangular cabinet having an interior defined by top and bottom walls, a back wall and lateral side walls, and a door with a watertight seal for sealing the interior against water leakage;

water drain means in said bottom wall for conducting water out of said interior;

at least one set of rails mounted on said interior lateral side walls of said cabinet;

at least one open mesh basket slidably received and supported on said rails, said basket sized and shaped to hold a plurality of fruits and/or vegetables;

water spray means in said cabinet interior positioned to direct a spray of water onto the contents of said basket;

water drain means in said bottom wall for conducting water out of said interior;

a water inlet hose having a first end connectable in fluid communication with said water spray means and a second end connectable in fluid communication with a water source, and a water drain hose having a first end connectable in fluid communication with said drain means and having a second end adapted to discharge water into a water drain line;

an electrical circuit including a timer circuit housed in said cabinet connected with a power cord adapted for connection to an electrical power source;

water inlet valve means connected with said water spray means for controlling water supplied thereto;

timing control means on an exterior of said cabinet connected with said timer circuit for selecting desired time intervals for directing a spray of water onto the contents of said basket; and refrigeration means in said cabinet connected with said electrical circuit for cooling the contents of said basket;

switch means on said cabinet for controlling the operation of said refrigeration means; and thermostat means on said cabinet connected with said electrical circuit and said refrigeration means for regulating the temperature in said interior.

2. The refrigerated automatic fruit and vegetable washer according to claim 1, wherein
said refrigeration means comprises a solid-state thermoelectric cooling system.

3. The refrigerated automatic fruit and vegetable washer according to claim 2, wherein
said thermoelectric cooling system operates on polarized DC current and has a thermovoltiac member that will get cold when polarized DC current is applied and will get warm when the polarity is reversed; and
said switch means on said cabinet includes a polarity control switch for controlling the polarity of DC current supplied to said thermovoltaic member for selectively cooling said interior to maintain the contents of said basket in a cool condition, or warming said interior to facilitate drying of the contents of said basket.

4. The refrigerated automatic fruit and vegetable washer according to claim 1, wherein
said refrigeration means includes a fan for circulating air in said interior.

5. The refrigerated automatic fruit and vegetable washer according to claim 1, further comprising:
a water filter disposed between said water inlet hose and said water inlet valve filtering water conducted thereto.

6. The refrigerated automatic fruit and vegetable washer according to claim 5, further comprising:
a water filter member having a water inlet adapted to be connected with the outlet of the existing water faucet and having a water outlet adapted to be connected with said faucet adapter for conducting filtered water thereto.

7. The refrigerated automatic fruit and vegetable washer according to claim 1, further comprising:
a faucet adapter adapted to be connected with the outlet of an existing water faucet and having a water supply fitting for connection to said water inlet hose second end and a water drain fitting for connection to said water drain hose second end; wherein
said faucet adapter directs fresh water through said water inlet hose and receives water from said water drain hose and directs drained water into a sink drain.

8. The refrigerated automatic fruit and vegetable washer according to claim 1, wherein
said water spray means comprises at least one spray nozzle.

9. The refrigerated automatic fruit and vegetable washer according to claim 1, wherein
said water spray means comprises a water conducting arm rotatably mounted in said interior and having at least one spray nozzle thereon.

10. The refrigerated automatic fruit and vegetable washer according to claim 1, wherein
said cabinet is thermally insulated.

11. The refrigerated automatic fruit and vegetable washer according to claim 1, wherein
said cabinet portable.

12. The refrigerated automatic fruit and vegetable washer according to claim 1, wherein
said cabinet is installed beneath a kitchen countertop.

13. The refrigerated automatic fruit and vegetable washer according to claim 1, wherein
said refrigeration means comprises a gas refrigeration system including associated compressor, cooling coils, and fan.

14. The refrigerated automatic fruit and vegetable washer according to claim 1, wherein
said cabinet is removably mounted in a compartment in a refrigerator; and
said door is configured to match the decor of the refrigerator; wherein
said refrigerated automatic fruit and vegetable washer is stored in said compartment during non-use and removed therefrom for use.

15. An automatic fruit and vegetable washer adapted be removably received and stored in a vegetable crisper compartment of a refrigerator, comprising:
a generally rectangular cabinet sized and shaped to be removably received and stored in a vegetable crisper compartment of a refrigerator and having an interior defined by top and bottom walls, a back wall and lateral side walls, and a door with a watertight seal for sealing the interior against water leakage;
at least one set of rails mounted on said interior lateral side walls of said cabinet;
at least one open mesh basket slidably received and supported on said rails, said basket sized and shaped to hold a plurality of fruits and/or vegetables;
water spray means in said cabinet interior positioned to direct a spray of water onto the contents of said basket;
water inlet means on said cabinet connected in fluid communication with said water spray means for connecting a water inlet hose in fluid communication with said water spray means; and
water drain means in said bottom wall including means for connecting a water drain hose in fluid communication with said interior for conducting water therefrom.

16. The automatic fruit and vegetable washer according to claim 15, further comprising:
rails on an exterior of said cabinet for slidably supporting said cabinet on existing vegetable crisper tray support tracks in the refrigerator.

17. The automatic fruit and vegetable washer according to claim 15, further comprising:
an electrical circuit including a timer circuit housed in said cabinet, including an electrical receptacle for receiving a power cord connectable to an electrical power source;
water inlet valve means connected with said water spray means for controlling water supplied thereto; and
timing control means on an exterior of said cabinet connected with said timer circuit for selecting desired time intervals for directing a spray of water onto the contents of said basket.

18. The automatic fruit and vegetable washer according to claim 15, further comprising:
a water inlet hose having a first end connectable in fluid communication with said water inlet means, and a water drain hose having a first end connectable in fluid communication with said water drain means;
a faucet adapter adapted to be connected with the outlet of an existing water faucet and having a water supply fitting for connection to a second end of said water inlet hose and a water drain fitting for connection to a second end of said water drain hose; wherein
said faucet adapter directs fresh water through said water inlet hose and receives water from said water drain hose and directs drained water into a sink drain.

19. The automatic fruit and vegetable washer according to claim 15, further comprising:

air passageway means on said cabinet in fluid communication between the exterior of said cabinet and said interior to facilitate air circulation of air in the refrigerator through said cabinet interior to maintain the contents of said basket at a cool temperature.

20. The combination of a refrigerator and an automatic fruit and vegetable washer, comprising:

a refrigerator having an electrical system, a gas refrigeration system with the associated compressor, cooling coil, and fan, and a chilled water dispensing system with water conduit; and a fruit and vegetable washer compartment in said refrigerator, comprising:

a generally rectangular compartment having an interior defined by top and bottom walls, a back wall and lateral side walls, and a door with a watertight seal for sealing the interior against water leakage;

at least one set of rails mounted on said interior lateral side walls of said cabinet;

at least one open mesh basket slidably received and supported on said rails, said basket sized and shaped to hold a plurality of fruits and/or vegetables;

water inlet means connected in fluid communication with said refrigerator water conduit including water inlet valve means for controlling water supplied thereto;

water spray means in said interior connected with said water inlet valve means and positioned to direct a spray of water onto the contents of said basket;

water drain means in said bottom wall for conducting water therefrom.

timing control means connected with said water inlet valve means and with said refrigerator electrical system for selecting desired time intervals for directing a spray of water onto the contents of said basket;

air duct means with damper means connected in fluid communication between said interior and said refrigerator fan for circulating air in said refrigerator through said interior to maintain the contents of said basket at a cool temperature; and thermostat means in said interior connected with said refrigerator electrical system circuit and said refrigeration system for regulating the temperature in said compartment interior.

* * * * *